(12) United States Patent
Banga

(10) Patent No.: US 10,249,199 B2
(45) Date of Patent: Apr. 2, 2019

(54) SYSTEM AND METHOD FOR AERIAL SYSTEM DISCRIMINATION AND ACTION

(71) Applicant: Airspace Systems, Inc., San Leandro, CA (US)

(72) Inventor: Jasminder S. Banga, San Francisco, CA (US)

(73) Assignee: Airspace Systems, Inc., San Leandro, CA (US)

( * ) Notice: Subject to any disclaimer, the term of this patent is extended or adjusted under 35 U.S.C. 154(b) by 0 days.

(21) Appl. No.: 15/598,303

(22) Filed: May 17, 2017

(65) Prior Publication Data

US 2018/0197420 A1 Jul. 12, 2018

Related U.S. Application Data

(60) Provisional application No. 62/309,838, filed on Mar. 17, 2016.

(51) Int. Cl.
| | |
|---|---|
| G08G 5/00 | (2006.01) |
| G01S 13/78 | (2006.01) |
| B64C 39/02 | (2006.01) |
| G01S 15/74 | (2006.01) |
| G06F 21/00 | (2013.01) |
| G07C 9/00 | (2006.01) |
| G01S 19/13 | (2010.01) |

(52) U.S. Cl.
CPC ........... *G08G 5/006* (2013.01); *B64C 39/024* (2013.01); *G01S 13/78* (2013.01); *G01S 15/74* (2013.01); *G06F 21/00* (2013.01); *G07C 9/00111* (2013.01); *G08G 5/0008* (2013.01); *G08G 5/0013* (2013.01); *G08G 5/0026* (2013.01); *G08G 5/0043* (2013.01); *G08G 5/0069* (2013.01); *G08G 5/0082* (2013.01); *B64C 2201/12* (2013.01); *B64C 2201/141* (2013.01); *B64C 2201/146* (2013.01); *G01S 19/13* (2013.01)

(58) Field of Classification Search
CPC .............................. G08G 5/006; G08G 5/005
USPC ......................................................... 340/5.61
See application file for complete search history.

(56) References Cited

U.S. PATENT DOCUMENTS

| | | | |
|---|---|---|---|
| 6,218,941 B1 | 4/2001 | Cromer | |
| 9,689,976 B2 * | 6/2017 | Parker | ..................... F41H 11/02 |
| 9,792,613 B2 * | 10/2017 | Gong | ..................... H04L 63/101 |
| 9,835,709 B2 * | 12/2017 | Tran | .......................... G01S 1/68 |
| 2006/0175464 A1 | 8/2006 | Chang | |
| 2007/0239986 A1 | 10/2007 | Viggiano | |
| 2012/0153084 A1 | 6/2012 | Etzkorn | |

(Continued)

FOREIGN PATENT DOCUMENTS

CN 105206114 A 12/2015

*Primary Examiner* — Qutbuddin Ghulamali
(74) *Attorney, Agent, or Firm* — Van Pelt, Yi & James LLP

(57) ABSTRACT

An aerial system discrimination system includes an aerial system disruption system, an aerial system identification system, and a permissions module. The discrimination system can additionally include or use an identifier transmission system configured to mount to the aerial system. The discrimination system functions to determine whether an aerial system is authorized or unauthorized to be in the airspace. The discrimination system can additionally function to prevent, disrupt, remove, or otherwise interact with an unauthorized aerial system within the airspace.

9 Claims, 6 Drawing Sheets

(56) References Cited

U.S. PATENT DOCUMENTS

| | | |
|---|---|---|
| 2015/0146724 A1 | 5/2015 | Leung |
| 2015/0179028 A1 | 6/2015 | Bairaktaris |
| 2015/0212206 A1* | 7/2015 | Lee .................... H04L 63/0823 342/30 |
| 2016/0036513 A1 | 2/2016 | Klippert |
| 2017/0059692 A1* | 3/2017 | Laufer ...................... G01S 7/38 |
| 2017/0069214 A1* | 3/2017 | Dupray ................ G08G 5/0021 |

* cited by examiner

SYSTEM AND METHOD FOR AERIAL SYSTEM DISCRIMINATION AND ACTION

CROSS-REFERENCE TO RELATED APPLICATIONS

This application claims priority to U.S. Provisional Patent Application Ser. No. 62/309,838, filed on 17 Mar. 2016 which is incorporated herein by reference.

TECHNICAL FIELD

This invention relates generally to the aeronautics field, and more specifically to a new and useful aviation discrimination and action system and method in the avionics field.

BACKGROUND

With the increased popularity of commercial unmanned aerial vehicles (UAVs), airspace traffic has been increasing at an unprecedented rate. This increased traffic raises the need to: monitor airspace for the presence of UAVs, distinguish authorized from unauthorized UAVs, prevent unauthorized UAVs from entering restricted airspace, and/or selectively remove unauthorized UAVs from the airspace.

However, monitoring, preventing, and/or removing unauthorized UAVs from restricted airspace can be difficult when authorized UAVs are concurrently within the airspace. Conventional UAV prevention and/or removal systems are global and incapable of distinguishing between authorized and unauthorized UAVs. Manual UAV prevention and/or removal systems are also inadequate because unauthorized UAVs are difficult to visually distinguish from authorized UAVs. Thus, there is a need in the aerospace field to create a new and useful aerial system discrimination system for selective removal from and/or permission into the airspace.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
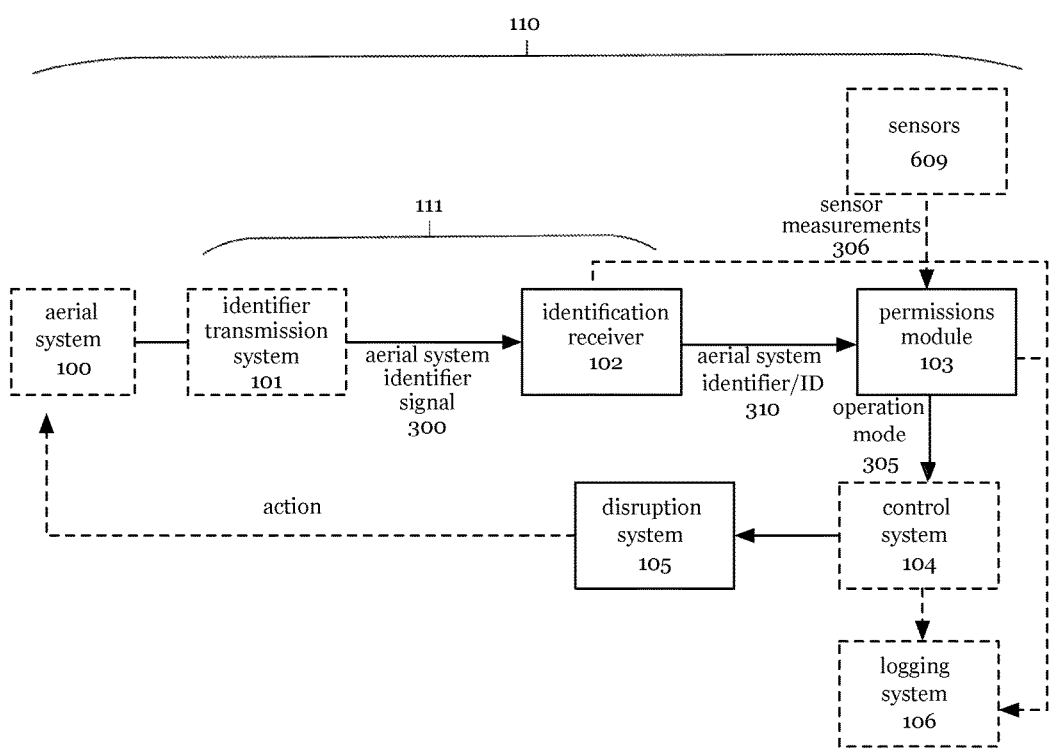
FIG. 1 is a schematic representation of the aerial system discrimination system.

As shown in FIG. 1, the aerial system discrimination system 110 includes an aerial system disruption system 105, an aerial system identification system 111, and a permissions module 103. The discrimination system 110 can additionally include or use an identifier transmission system 101 configured to mount to, or be embedded in, an aerial system 100. The discrimination system 110 functions to determine whether an aerial system 100 is authorized or unauthorized to be in the airspace. The discrimination system 110 can additionally function to prevent, disrupt, remove, or otherwise interact with an unauthorized aerial system within the airspace.

In a specific example, the discrimination system 110 includes: a disruption system 105 including a launcher 303 and an interdiction module 304; an identification system 111 including a wireless communication system; and a permissions module 103 connected to the wireless communication system. In operation, the wireless communication system receives an aerial system identifier signal 300 broadcast from a aerial system 100. The aerial system identifier 300 is checked against the permissions module 103, which determines whether the aerial system identifier 300 is associated with an authorized or unauthorized UAV. The disruption system 105 can be automatically disabled (e.g., locked) in response to determination that the UAV is authorized, and/or automatically activated (e.g., unlocked) in response to determination that the UAV is unauthorized (e.g., reporting an unauthorized identifier, not reporting an identifier, etc.). When the disruption system 105 is in an unlocked state, the launcher 303 can launch the interdiction module 304 toward the UAV, wherein the interdiction module 304 can immobilize the motive mechanism of the aerial system 100 (e.g., by disabling the power system, entangling the motive mechanism, etc.). The identification system 111 optionally includes a set of sensors 609 (e.g., radar, microphone, LIDAR etc.), wherein the identification system 111 detects the presence of a UAV within a predetermined airspace based on one or more measurements from the sensors 609. In response to UAV detection, the discrimination system 110 can: activate a receiving wireless communication module 607 for aerial system identifier receipt; aim the launcher 303 and/or interdiction module 304 toward the UAV based on the sensor measurements 306; and/or perform any other suitable functionality. The discrimination system 110 can additionally selectively activate (e.g., unlock) the disruption system 105 when a UAV without a UAV identifier is detected (e.g., wherein the disruption system 105 is activated response to the absence of a UAV identifier).

2. Benefits

The discrimination system 110 can confer several benefits. First, the discrimination system 110 can discriminate between authorized and unauthorized aerial systems. This enables the discrimination system 110 to treat authorized aerial systems differently from unauthorized aerial systems (e.g., leave alone vs. interdict, respectively). Second, in some variations, the identifier transmission system 101 includes a wireless communication chipset 605 (e.g., WiFi, BLE, or LTE chipset), which broadcasts the aerial system identifier 300 over a long geographic distance. Third, in some variations, the aerial system identifier 300 can be refreshed at a predetermined frequency, wherein the identification system 111 can record and identify the aerial system 100 based on the time-ordered series of broadcast identifiers. This can function to prevent identifier tampering and/or reproduction. Fourth, in some variations, the aerial system 100 can include a first and second identifier, transmitted by a first and second identifier transmission system, respectively, wherein the second identifier can function as a backup identifier (e.g., in case the primary identifier transmission system is inoperable), a second factor identifier for the aerial system 100 (e.g., as a secondary authenticator for the aerial system to prevent tampering and/or identifier reproduction), an identifier for a secondary identification system (e.g., a user device-compatible identifier), or be used in any other suitable manner. In one example, the first identifier transmission system can be a WiFi chipset, while the second identifier transmission system can be an optical signal generator (e.g., a blinking LED). However, the discrimination system 110 can confer any other suitable benefit. Fifth, in some variations, the discrimination system 110 can selectively route and/or treat aerial systems 100 proximal or within the airspace based on the respective identifier.

This discrimination system 110 can additionally assuage user concerns. From an aerial system 100 owner's perspective, the discrimination system 110 can allow the owner to gain access to restricted airspace to record rare content; prevent the owner from losing the drone; and enable the owner to easily comply with aerial system regulations (e.g., registration). From the restricted airspace entity's perspective, the discrimination system 110 can enable the entity to selectively permit aerial systems into their airspace (e.g., monetize access to airspace), monitor which aerial systems 100 are within their airspace (e.g., prevent liability), and control release of content generated from physical regions associated with the airspace (e.g., control which drones can record footage of sporting events within an arena). However, the discrimination system 110 can confer any other suitable set of benefits.

3. System for Aerial System Discrimination.

All or part of the discrimination system 110 is preferably used with an aerial system 100. An aerial system 100 is preferably an aircraft (e.g., a manned or unmanned aircraft), but can alternatively or additionally be a terrestrial system, aquatic system, or be any other suitable system. Examples of aerial systems 100 include gliders, rotorcraft, humanpowered aircraft (HPA), unmanned aerial vehicles (UAVs), planes, drones, or any other suitable aerial system. The aerial system 100 can be automatically controlled, manually controlled (e.g. by a remote control), or otherwise controlled.

The aerial system 100 is preferably associated with an aerial system identifier or ID 310 which may be transmitted via an aerial system identifier signal 300, but can alternatively be unidentified. The aerial system identifier signal 300 can be that transmitted by the identifier transmission system 110, be a permanent identifier for the aerial system 100 (e.g., a manufacturer-assigned identifier), or can be a different identifier.

The aerial system identifier signal 300 can be static (e.g., predetermined) or dynamic (e.g., periodically generated). The aerial system identifier signal 300 can be automatically generated (e.g., by the aerial system, by a manufacturer, etc.), manually generated, or otherwise generated. The aerial system identifier signal 300 can be automatically: selected, calculated (e.g., based on an on-board equation, remotely stored equation, etc.), or otherwise determined. The aerial system identifier signal 300 can be globally unique, locally unique (e.g., to a geographic location, to an aerial system manufacturer or type, etc.), or generic. The aerial system identifier signal 300 can additionally be associated with an entity, location, or any other suitable parameter.

The disruption system 105 is preferably used to monitor restricted airspace 301ab. The restricted airspace 301ab is preferably a physical volume defined by a geographic region and altitude, but can alternatively be otherwise defined. The geographic region can be defined by a set of geographic coordinates (e.g., latitude and longitude), a place name (e.g., county, city, landmark, intersection, etc.), a physical street address, distance from a given location, a specified radius from a given location, a graphical depiction on a map, a geofence, a dynamic geographic region (e.g., that changes based on time of day, weather, etc.) or any other suitable location expression. The altitude can be a distance from the ground, be a range of distances from the ground, be an absolute altitude (e.g., from sea level), or be otherwise defined. The restricted airspace 301ab can be automatically defined or manually defined. For example, the geographic region and/or altitude can be predetermined, received from a user (e.g., from a user device), or otherwise determined. The restricted airspace 301ab is preferably associated with an entity, airspace identifier, or any other suitable parameter.

The restricted airspace 301ab is preferably associated with a set authorized aerial system identifiers (e.g., a whitelist), but can alternatively or additionally be associated with a set of unauthorized aerial system identifiers (e.g., a blacklist). One or more of the aerial system identifiers 310 can be associated with one or more aerial system permissions 307. The permissions can include: temporal limitations (e.g., permitted only from 10:30 a to 11:00 a), geographic limitations (e.g., permitted above a first geographic region, not permitted above a second geographic region), altitude limitations (e.g., permitted only between 100 ft-200 ft above the stadium), aerial system entity limitations (e.g., only aerial systems associated with listed entities are permitted), aerial system type, function (e.g., data streaming prohibited, data streaming permitted, permitted emission types, etc.), predicted behavior (e.g., predicted travel path, predicted endpoint, etc.), or any other suitable set of permissions. The set of authorized aerial system identifiers and/or associated permissions is preferably determined by the restricted airspace entity, but can alternatively be otherwise defined.

In some variations, the discrimination system 110 can additionally include auxiliary sensors in a telemetry system 609, wherein the telemetry system can constantly or periodically forward sensor measurements 306 or data derived therefrom to the identification receiver 102 or another endpoint. Measurements recorded by the sensors can include: GPS coordinates, speed, acceleration, target destination, aerial system operation parameters (e.g., SOC), ambient environment parameters (e.g., windspeed, heading, temperature etc.), or any other suitable parameter. The telemetry system 609 can be the identifier transmission system 101 or be a separate and distinct component.

The telemetry system 609 can be a radio, light emitter, radar, LIDAR or be any other suitable system.

3.1. Identification System.

The identification system 111 of the discrimination system 110 functions to receive the aerial system identifier signal 300 from the aerial system 100. Additionally or alternatively, the identification system iii can function to detect the presence of a UAV within a physical volume. The identification system 111 is preferably mounted to the disruption system 105, more preferably the launching mechanism 303, but can alternatively be mounted to the interdiction system 304, a secondary mounting point (e.g., building, second aerial system, ground, etc.), or any other suitable mounting point. Alternatively, the identification system 111 can be part of a secondary system, such as a user device 405 (e.g., a smartphone, tablet, etc.).

The identification system 111 can include an identification receiver 102, which functions to receive the aerial system identifier signal 300. The identification receiver 102 can be passive (e.g., receive information broadcast by the aerial system 100), active (e.g., be powered, request information from and/or provide power for information broadcast by the aerial system 100), or be otherwise configured.

Figure 6:
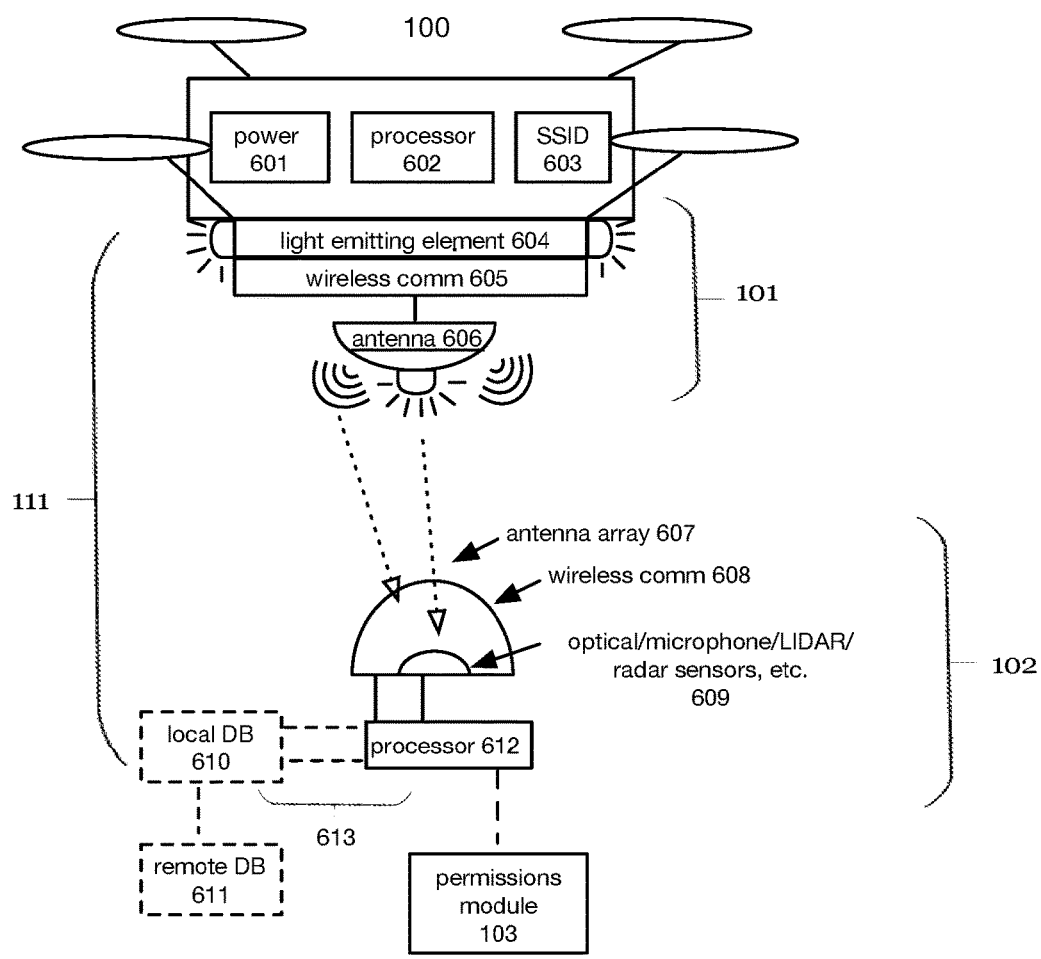
FIG. 6 is a specific example of an aerial system and detection system.

In a first variation, as shown in FIG. 6, the identification receiver 102 is a wireless communication module including an antenna array 607 and chipset 608 but can alternatively include any other suitable component. The antenna array 607 of the identification receiver 102 functions to receive broadcast signals from an aerial system 100. The antenna array 607 can include one or more antennas. The antenna 607 is preferably mounted to the disruption mechanism 105, but can alternatively be mounted to any other suitable mounting point. In one variation, the antenna 607 can be external and extend perpendicular the launching mechanism 303 longitudinal axis. In a second variation, the antenna 607 can extend parallel the launching mechanism 303 longitudinal axis. In a specific example, the antenna 607 can be embedded along the length of the launching mechanism 303. However, the identification receiver 102 can be otherwise arranged relative to the disruption mechanism 105. In a third variation, the antenna 607 is separate from the disruption mechanism 105. The antenna 607 can be a directional antenna, omnidirectional antenna, or be any other suitable antenna. Examples of the antenna 607 include: a Yagi-Uda antenna, a log-periodic antenna, a corner reflector antenna, or any other suitable antenna.

The chipset 608 of the identification receiver 102 functions to interpret the
received aerial system identifier signal 300. The chipset 608 preferably interprets the signal 300 into the aerial system identifier 310 (e.g., decrypts the signal, etc.), but can alternatively interpret the signal 300 into a set of data indicative of the identifier 310, or otherwise interpret the signal 300. The chipset 608 can function as a receiver only, transceiver, or perform any other suitable functionality. The chipset 608 is preferably electrically connected to the antenna 607, but can alternatively be otherwise connected to the antenna 607. The chipset 608 can be connected to the permissions module 103, wherein the chipset 608 sends the raw or processed signal to the permissions module 103 for permissions determination. However, the chipset 608 can include the permissions module 103 or communicate the signal 300 to any other suitable endpoint.

In a second variation, the identification receiver 102 includes a signal receiver 609 that functions to read the aerial system identifier 310 off the aerial system 100 from signals reflected off or emitted by the aerial system 100. The identification receiver 102 can include one or more signal receivers 609 of the same or different type, operated concurrently or asynchronously). The signal receiver 609 can record one or more measurements (e.g., frames), wherein the aerial system identifier 310 can be read from a single measurement, from a plurality of measurements (e.g., a time-ordered set of frames, mosaiced frames, etc.), or from any other suitable number of measurements. When the identification receiver 102 is mounted to the disruption mechanism 105, the signal receiver 102 is preferably arranged such that the field of measurement (e.g., field of view) is substantially coincident with the aiming mechanism of the disruption mechanism 105. However, the signal receiver 102 can be otherwise arranged.

The signal receiver 609 can be: an optical sensor, acoustic sensor, an electromagnetic wave receiver, or be any other suitable sensor. The optical sensor can be a CCD camera, CMOS camera, multispectral camera, hyperspectral camera, stereoscopic camera, thermal camera, IR camera, or be any other suitable camera. The acoustic sensor can be a sonar receiver, an ultrasound receiver, microphone, array of microphones, or be any other suitable acoustic sensor. The electromagnetic wave receiver can be: a radar system, a microwave receiver, or be any other suitable electromagnetic wave receiver.

In this variation, the identification receiver 102 can additionally include a signal emitting element that functions to emit a signal read by the camera. In operation, the emitted signal is directed toward the aerial system 100, the aerial system identifier transmission system 101 reflects the signal, and the identification receiver 102 reads the reflected signal. In one example, the emitted signal can read a visual indicator (e.g., a barcode, flashing light, etc.) from the aerial system 100. The signal-emitting element can be: a light source (e.g., white light, spotlight, laser, etc.), an acoustic source (e.g., ultrasound source, 3 m acoustic wave source, etc.), an electromagnetic wave source (e.g., radio wave source), or be any other suitable element capable of emitting a signal. The signal-emitting element can emit a directional signal, omnidirectional signal, or any other suitable signal. In one variation, the signal is directed along a portion of the firing path, such that the signal emitted by signal emitting element hits the target when the disruption system 105 is aimed at the target. However, the identification reader 102 can include any other suitable component capable of reading or otherwise receiving the aerial system identifier 310.

When the identification reader 102 is active, the identification reader 102 can additionally include or be connected to a power source that powers the identification reader 102 or components thereof. The power source can be a generator, a battery (e.g., a secondary battery, primary battery), power grid, or any other suitable power source. When the identification reader 102 is mounted to a mobile mounting point (e.g., the disruption system, second aerial system, etc.), the identification reader 102 can be tethered to the power source by a wire, carry the power source onboard, or otherwise access the power source.

The identification receiver 102 can additionally include a set of sensors 609, wherein the sensor measurements 306 can be used to: detect the presence of an aerial system 100 within a physical volume (e.g., detect aerial system proximity), refine disruption system aim (e.g., triangulate aerial system location within the volume), guide the disruption system 105 toward the aerial system 100, generate secondary information about the physical volume, locate the disruption system 105, or perform any other suitable functionality. In one example of disruption system operation, aerial system presence within the physical volume is detected based on the sensor measurements 306, the identification reader 102 is turned on in response to aerial system detection, and the identification reader 102 receives the aerial system identifier signal 300 (or determines the lack thereof) from the aerial system 100. However, the sensors 609 can be otherwise used.

The sensors 609 are preferably arranged on the disruption system 105, more preferably the launching mechanism 303 but alternatively the interdiction mechanism 304, but can alternatively be arranged on any other suitable component. The sensors 609 can include: audio sensors, optical sensors, electromagnetic wave receivers, location sensors (e.g., GPS system, trilateration system, acclerometer, gyroscope, altimeter, etc.), radar, LIDAR, or any other suitable sensor. The sensors 609 can be the same sensors as that of the identification reader 102, the same type of sensors as that of the identification reader 102, different sensors from that of the identification reader 102, or be any other suitable sensor. In a first example, the sensors 609 can include radar or sonar that function to identify aerial system presence in the volume. In a second example, the sensors 609 can include audio sensors that are sensitive at the frequencies of the aerial system motors and rotors, which can function to differentiate aerial systems 100 from birds, balloons, or other aerial elements (e.g., due to the different acoustic signature). In a third example, the sensors 609 can include thermal sensors, which can function to differentiate aerial systems 100 from birds, balloons, or other aerial elements (e.g., due to the different thermal pattern). However, the identification receiver 102 can include any other suitable set of sensors.

Sensor measurements 306 can be provided to an aerial system identification module 613, which functions to determine whether an aerial system 100 is within the physical volume. The aerial system identification module 613 can additionally function to determine one or more parameters of the aerial system 100 (e.g., aerial system type, class, etc.). The sensor measurements 306 provided to the aerial system identification module 613 can include: a single sensor measurement 306 from a single sensor; a stream of sensor measurements 306 from a single sensor (e.g., wherein the aerial system is identified from the stream); a single sensor measurement 306 from each of a plurality of sensors, taken at substantially the same time or within a predetermined time duration of each other; a stream of sensor measurements 306 from each of a plurality of sensors (e.g., wherein aerial system is identified from a combination of all the streams); or any other suitable set of sensor measurements 306. The aerial system identification module 613 is preferably a dynamic model that is updated with each new aerial system identification, but can alternatively be a substantially static model. The model is preferably developed using machine learning techniques on a processor 612, and the models may be stored on a local database 610 or a remote database 611, but can be otherwise developed. The aerial system identification module 613 can use supervised learning (e.g., using logistic regression, using back propagation neural networks, using random forests, decision trees, etc.), unsupervised learning (e.g., using an Apriori algorithm, using K means clustering), semi-supervised learning, reinforcement learning (e.g., using a Q-learning algorithm, using temporal difference learning), or any other suitable learning style. The aerial system identification module 613 is preferably a classification module (e.g., classifies the target as an aerial system or non aerial system), but can alternatively be a regression module (e.g., calculate a probability of the target being an aerial system), or be any other suitable module. The aerial system identification module 613 can be a probabilistic module, heuristic module, deterministic module, or be any other suitable module leveraging any other suitable computation method, machine learning method, or combination thereof.

3.2. Identifier Transmission System.

The discrimination system 110 can additionally include an identifier transmission system 101 that functions to mount to an aerial system 100 and transmit an aerial system identifier signal 300 to the identification receiver 102. The identifier transmission system 101 preferably periodically or constantly broadcasts the aerial system identifier signal 300, but can alternatively display the aerial system identifier 310, send the aerial system identifier signal 300 in response to receipt of a request for the aerial system identifier 310, or otherwise transmit the aerial system identifier 310.

The aerial system identifier 310 preferably identifies an aerial system 100, and is preferably globally unique, but can alternatively be unique for a geographic region, unique for a period of time, generic, or otherwise related to other aerial system identifiers. The aerial system identifier 310 is preferably dynamic, but can alternatively be static. Dynamic aerial system identifiers can be generated, re-assigned, calculated (e.g., based on a static identifier and a changing equation; based on changing identifier and a static equation; based on static identifier, a static equation, and a changing factor, such as a timestamp or a GPS coordinate, etc.), or otherwise determined at a predetermined frequency, in response to the occurrence of a trigger event (e.g., upon user reassignment of the identifier transmission system 101 to a different aerial system), or at any other suitable time. The dynamic aerial system identifier can be generated on-board the aerial system 100, generated remotely (e.g., at a remote computing system, etc.; updated in-flight or when connected to a predetermined communication connection type, etc.), or generated by any other suitable system. The aerial system identifier 310 is preferably encrypted, but can alternatively be unencrypted. The aerial system identifier 310 is preferably an alphanumeric string, but can alternatively be an image, pattern, combination of features (e.g., combination of colors, combination of colors and light emission patterns, etc.), a flight pattern, or be any other suitable identifier.

As shown in FIG. 6, the identifier transmission system 101 preferably mounts to an aerial system 100, but can alternatively be embedded within the aerial system 100, be a component of the aerial system 100 (e.g., perform dual functionality), be embedded into the electronic hardware of the aerial system 100, or be otherwise associated with the aerial system 100. The identifier transmission system 101 preferably includes identification transmitters and a coupling mechanism, but can alternatively include any other suitable component.

The identification transmitters of the identifier transmission system 110 functions to transmit the aerial system identifier 310. In a first variation, the identification transmitter is an optical image, such as a barcode, QR code, picture, surface feature, or other optical image, wherein the optical image functions as, embeds, links to, or is otherwise associated with the aerial system identifier 310. The optical image can be static (e.g., be a sticker), dynamic (e.g., be displayed by a display on the aerial system), or have any other suitable property. However, the optical image can otherwise function as the identification transmitter.

In a second variation, the identification transmitter is a set of light emitting elements 604 (e.g., optical signal emitting elements). The light emitting elements 604 can be LEDs, OLEDs, incandescent light, or any other suitable light emitting element. The wavelength of the emitted light can be in the visual range and/or outside of the visual range. The emitted light can be encrypted, unencrypted, or otherwise secured. In a first embodiment, the set of light emitting elements 604 emit modulated light, wherein the modulated light can be interpreted into the aerial system identifier 310. In a second embodiment, the set of light emitting elements 604 emit light pulses according to a predetermined pattern, wherein the predetermined pattern functions as the aerial system identifier 310. The aerial system 100 can include a single light emitting element on the aerial system exterior, a ring of light emitting elements, or any suitable number of light emitting elements arranged in any other suitable configuration. However, the light emitting elements 604 can otherwise function as the identification transmitter.

In a third variation, the identification transmitter is an electromagnetic wave transmitter. The electromagnetic wave transmitter can include a chipset 605, an antenna 606, and/or any other suitable component. The chipset 605 can function to determine the aerial system identifier 310 (e.g., store the aerial system ID, generate the aerial system ID using an onboard processor 602, select an ID from a stored whitelist of SSIDs 603 etc.) and control the antenna 606 to broadcast a signal representative of the aerial system identifier 310. Examples of the electromagnetic wave transmitter include: a WiFi transmitter, an RFID tag, a Bluetooth beacon (e.g., BLE beacon), a cellular modem (e.g., 3G, 4G, LTE, etc.), an ADS-B radio, or any other suitable electromagnetic wave transmitter. However, the identification transmitter can include any other suitable mechanism capable of transmitting an identifier.

The coupling mechanism of the identifier transmission system 101 functions to couple the identification transmitter to the aerial system 100. The coupling mechanism is preferably substantially permanent, but can alternatively be removable (e.g., transient), such that the identifier transmission system 101 can be moved between different aerial systems 100. Examples of the coupling mechanism include: clips, adhesive, weldments, complimentary magnets, straps, or any other suitable coupling mechanism.

The identifier transmission system 101 can optionally include a tamper detection mechanism that functions to indicate whether the identifier transmission system 101 has been tampered with. In a first variation, the tamper detection mechanism includes a microswitch coupled to the coupling mechanism. Coupling mechanism decoupling from the aerial system 100 changes the microswitch state, which prevents the identifier transmission system 110 from transmitting an aerial system identifier signal 300 (e.g., shuts off the identifier transmission system 101, blocks identifier transmission system transmission, etc.). The identifier transmission system 101 can be reactivated upon verified user action (e.g., user login to a system associated with the identifier transmission system 101, user entry of a passcode, etc.) or upon the occurrence of any other suitable activation event. In a second variation, the tamper detection mechanism can include security potting that physically bonds to and encompasses the identifier transmission system electronics, such that identifier transmission system 101 removal from the aerial system 100 and/or attempts to physically access the identifier transmission system electronics physically destroys the identifier transmission system 101. In a third variation, the tamper detection mechanism can include a security mesh enclosing the identifier transmission system electronics that shorts the identifier transmission system electronics upon tampering. However, the tamper detection mechanism can include any other suitable component configured to prevent identifier transmission system tampering, render the identifier transmission system 101 inoperable upon tampering, and/or indicate past tampering.

The identifier transmission system 101 can additionally include a power source 601 that functions to power the identifier transmission system 101. Examples of the power source 601 include: secondary batteries (e.g., rechargeable batteries), primary batteries, energy harvesting systems, the aerial system power source, or any other suitable power source.

3.3. Permissioning System.

Figure 3:
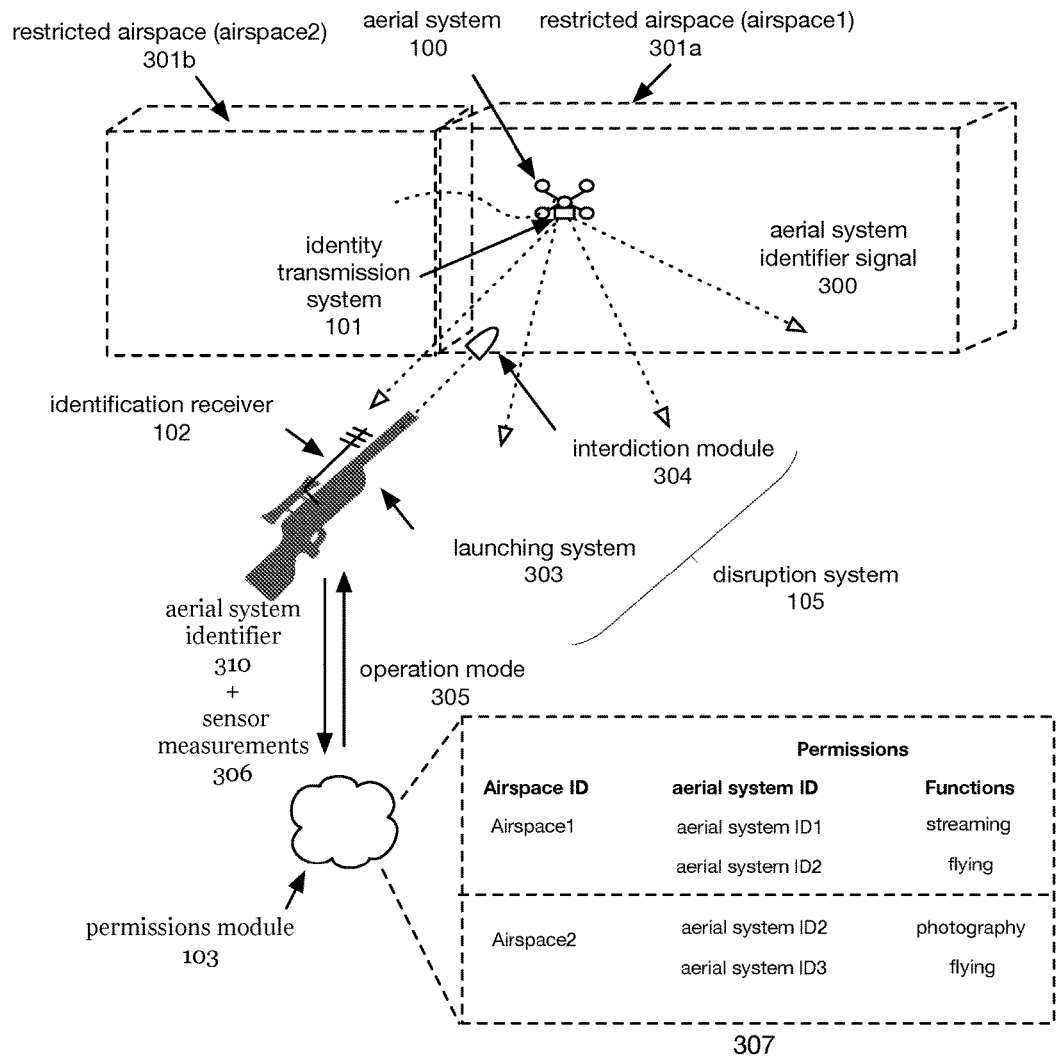
FIG. 3 is an example of discrimination system operation.

As shown in FIG. 3, the permissions module 103 of the discrimination system 110 functions to store permissions for the physical volume and/or individual aerial systems. The permissions module 103 can additionally function to determine whether the aerial system 100 has permission for a physical volume (e.g., restricted airspace 301ab), and/or generate operation permissions for the disruption mechanism 105 based on whether the aerial system identifier 310 is permitted. The permissions module 103 is preferably connected to, and receives information from, the identification receiver 102, but can alternatively be connected to the disruption module 105 or any other suitable component. The permissions module 103 can be: storage on-board the disruption module 105, storage on-board the identification receiver 102, a remote computing system connected to the disruption module (e.g., wherein the aerial system identifiers are sent to, and firing permissions are received from, the remote computing system), or be any other suitable computing system. In a first example, all disruption systems 105 are connected to a common permissions module 103. In a second example, each disruption system 105 is associated with a different permissions module 103, wherein the permissions for the airspace associated with the respective disruption system 105 are updated for the permissions module 103 associated with that disruption system 105. However, the permissions module 103 can be otherwise maintained. The permissions module 103 can be shared across one or more airspace entities, discrimination systems 110, identification receivers, 102 aerial system identifiers, or otherwise shared. Alternatively, the permissions module 103 can be specific to an airspace entity, discrimination system 110, identification receiver 102, aerial system identifier 310, or any other suitable population.

The permissions module 103 preferably stores the access permissions for an airspace identifier identifying a physical volume (e.g., predetermined airspace). The stored access permissions can include permitted and/or excluded: aerial system entities (and associated aerial system identifiers), aerial system identifiers, physical volumes associated with each aerial system identifier or set thereof (e.g., parameters defining the physical volume, such as a geofence, altitude range, etc.), functions associated with each aerial system identifier or set thereof (e.g., streaming media, recording images, delivery, etc.), physical endpoints associated with each aerial system identifier or set thereof, or any other suitable parameter. An entity (corporate, govt, or otherwise) could also maintain their own cloud-based permissions module 103 to which only they have access. The access permissions can be: received from and/or updated by a third party (e.g., that provides the disruption mechanism), a user account associated with the geographic region, an automatic system (e.g., wherein an aerial system entity or identifier is automatically removed from a permitted list or added to restricted list in response to nonpayment of a subscription, non-registration, etc.), or be otherwise determined.

3.4. Disruption System.

The disruption system 105 of the discrimination system 110 functions to disrupt aerial system movement. The disruption system 105 is preferably an active system, but can alternatively be a passive system. The disruption system 105 can be a manual system, automatic system, or be otherwise controlled. The disruption system 105 can be a handheld system, ground-based system, an aerial system (e.g., on a drone), or have any other suitable form factor. The disruption system 105 is preferably associated with and/or controlled by the entity associated with the restricted airspace, but can alternatively be associated with any other suitable entity. A restricted airspace 301ab can be associated with one or more disruption systems 105 of the same or different kind.

In one variation, shown in FIG. 3, the disruption system 105 can include a launching system 303 and an interdiction module 304, which cooperatively function to intercept, then interdict, the aerial system 100. However, the disruption system 105 can include a jamming system, an electromagnetic disruption system, a buckshot system (e.g., a system that fires buckshot), an ablation system, a projectile net system, or any other suitable mechanism capable of interfering with aerial system operation.

The launching system 303 of the disruption system 105 functions to propel the interdiction module 304. The launching system 303 preferably propels the interdiction module 304 into or proximal the restricted airspace 301ab, but can alternatively or additionally propel the interdiction module 304 into a physical region proximal the target aerial system 100 (e.g., within a predetermined radius of the target, such as within 100 ft), propel the interdiction module 304 into the target, or propel the interdiction module 304 to any other suitable physical endpoint. Examples of the launching system 303 include: a gun, a cannon, a catapult, a shoulder-based launcher (e.g., a t-shirt launcher, missile launcher, etc.), a second aerial system, or any other suitable launching system. The launching system 303 can include an aiming mechanism that functions to guide or determine the interdiction module 304 travel path after egress. Examples of the aiming mechanism include an elongated barrel (e.g., wherein the interdiction module 304 travels along the barrel length to egress), a gun sight, an active guidance system (e.g., a laser that paints the target, wherein the interdiction module 304 is propelled toward the painted target, a radar-guided system, camera-guided system, remote controlled system), or any other suitable aiming system. The launching system 303 can additionally include a firing mechanism that functions to propel the interdiction module 304 out the launching system. Examples of the firing mechanism include: combustible material (e.g., gunpowder), compressed gas (e.g., a gas canister), a rail gun, an electromagnet, or any other suitable firing mechanism capable of imparting a propulsion force on the interdiction module 304.

The interdiction module 304 of the disruption system 105 functions to interfere with aerial system 100 traversal through airspace. The interdiction mechanism 304 preferably interferes with aerial system 100 motive mechanism operation, but can additionally or alternatively interfere with the aerial system electronics and controls, disrupt the electrical connections between the control system and the motive mechanism (e.g., shorting the electrical connections, physically disconnecting the connections by explosion, etc.), or otherwise interfere with any other suitable aerial system component to disrupt aerial system traversal through airspace.

In a first variation, the interdiction module 304 includes a net that entangles the aerial system motive mechanism. The net, when unfurled, can be substantially planar, parabolic, or have any other suitable configuration. The net can include secondary filaments extending from the net broad face (e.g., wherein the secondary filaments are sucked into the motive mechanism), include a cinching mechanism (e.g., a line slidably extending through the net perimeter, magnets, adhesive, etc.), or include any other suitable component. However, the net can have any other suitable construction (e.g., be a set of filaments). In this variation, the net can be part of a single stage system that is directly fired from the launching system/mechanism 303. Alternatively, the net can be part of a two-stage system, wherein the net is encapsulated within an airframe. The airframe is launched from the launching mechanism 303, and the net is subsequently launched from the airframe while the airframe is in flight. However, the net can be otherwise propelled toward the target.

In a second variation, the interdiction module 304 includes a set of masses (e.g., bullets) that physically intercept the aerial system motive mechanism and/or electronics. The set of masses can include a single mass (e.g., one bullet), a plurality of masses (e.g., birdshot), or any other suitable number of masses. The masses can be part of a single-stage system that is directly fired from the launching mechanism 303. Alternatively, the masses can be part of a two-stage system, wherein the masses are encapsulated within a casing, the casing is launched from the launching mechanism 303, and the masses are propelled out of the casing while the casing is in flight. However, the masses can be otherwise propelled toward the target.

In a third variation, the interdiction module 304 includes collated light (e.g., a laser) that physically intercepts and burns the aerial system motive mechanism and/or electronics. The interdiction module 304 can include a single light source, multiple light sources (concurrently or asynchronously operated), or any suitable number of light sources arranged in any suitable configuration. The light sources can be part of a single stage system, wherein the light sources are mounted to and/or function as the firing mechanism. Alternatively, the light sources can be part of a two-stage system, wherein the light sources are encapsulated within a casing, the casing is launched from the launching mechanism 303, and the light sources emit light out of the casing while the casing is in flight. However, the light can be otherwise directed toward the target.

In a fourth variation, the interdiction module 304 includes an electromagnetic signal that disrupts avionics system data transmission, data receipt, and/or electronics operation. The interdiction module 304 can include a single electromagnetic wave generator, multiple electromagnetic wave generator (concurrently or asynchronously operated), or any suitable number of electromagnetic wave generator arranged in any suitable configuration. The electromagnetic wave generators can be part of a single stage system, wherein the electromagnetic wave generators are mounted to and/or function as the firing mechanism. Alternatively, the light sources can be part of a two-stage system, wherein the electromagnetic wave generators are encapsulated within a casing, the casing is launched from the launching mechanism, and the electromagnetic wave generators emit electromagnetic waves out of the casing while the casing is in flight. However, the electromagnetic waves can be otherwise directed toward the target.

In a fifth variation, the interdiction module 304 is propelled from a second aerial system (e.g. an interceptor drone) towards a target aerial system 100 when the target aerial system 100 is in rage of the second aerial system. In this variation the interdiction module 304 may include a net that entangles the target aerial system's motive mechanism. In this variation the launching system 303 is coupled to the airframe of the second aerial system and propels the interdiction module 304 via a force generator such as a spring or compressed gas flowing out of a gas chamber. Once entangled the target drone may remain tethered to the second aerial system and be appropriately transported outside of the restricted airspace 301ab.

However, the interdiction module 304 can include any other suitable component capable of disrupting aerial system operation.

3.5. Control System.

The discrimination system 110 can additionally include a control system 104 that functions to selectively activate or deactivate disruption system operation. The control system 104 can additionally or alternatively control an auxiliary system based on whether the aerial system 100 is permitted within the airspace 301ab. The control system 104 is preferably connected to the disruption system 105, more preferably to the launching mechanism 303 but alternatively the interdiction module 304, but can additionally or alternatively be connected to any other suitable component. The control system 104 is preferably operable between a locked and unlocked mode, but can alternatively be operable between any other suitable modes. The control system 104 preferably locks or otherwise disables disruption system 105 operation in the locked mode, and unlocks or otherwise enables disruption system 105 operation in the unlocked mode. The control system 105 can disable the disruption system 105 by acting on the launching mechanism 303 (e.g., disable the trigger, disconnect the power source, disconnect the trigger from the propulsion mechanism, etc.), acting on the tracking system (e.g., disable the tracking system), acting on the interdiction module 304 (e.g., prevent second-stage deployment), or otherwise interfere with disruption system operation. However, the control system 104 can otherwise control disruption operation. The selected operation mode 305 is preferably dependent upon whether the aerial system 100 has permissions for the physical volume (e.g., wherein the locked mode is selected when the aerial system does not have permission and the unlocked mode is selected when the aerial system has permission), but can alternatively be dependent upon any other suitable factor. The control system 104 can default to the locked mode, default to the unlocked mode, or default to any other suitable mode. In a first variation, the control system 104 can be a processing system that electronically controls disruption system operation (e.g., the processor that controls launching mechanism operation, the avionics of the interdiction module, etc.). In a second variation, the control system 104 can be a mechanical linkage between a launching mechanism trigger and propulsion initiation system that is selectively engaged or disengaged in the unlocked and locked mode, respectively. In a third variation, the control system 104 can be a cap that selectively occludes or opens a launching mechanism barrel. However, the control system 104 can include any other suitable mechanism or process that selectively permits disruption mechanism operation.

3.6. Logging System.

The discrimination system 110 can additionally include a logging system 106 that functions to store and/or provide histories for aerial system identifiers 310 (e.g., generated by the identifier transmission system 101, static identifier for the aerial system 100, etc.), airspace volume, an entity associated with a set of airspaces, an entity associated with a set of aerial systems, or any other suitable history. The history can include: operation history (e.g., SOC, flight velocity, etc.), parameters for aerial system collocation within a given volume of airspace (e.g., airspace identifier, timestamps, concurrent weather proximal the airspace, etc.), or any other suitable historic parameter. The history is preferably generated (automatically, etc.) in response to aerial system identification within the airspace (e.g., wherein the logging system can be coupled to the identification receiver), in response to determination of unauthorized aerial system presence within the airspace (e.g., wherein the logging system can be coupled to the permissions module), or at any other suitable time. The history can be used to predict aerial system action given a set of current operation parameters (e.g., using machine learning algorithms), to verify that the aerial system was within restricted airspace, to identify or verify the aerial system (e.g., wherein the discrimination system can query the aerial system for historic information, and verifies the aerial system upon receipt of the correct historic information), or be used in any other suitable manner.

4. Method for Aerial System Discrimination

Figure 2:
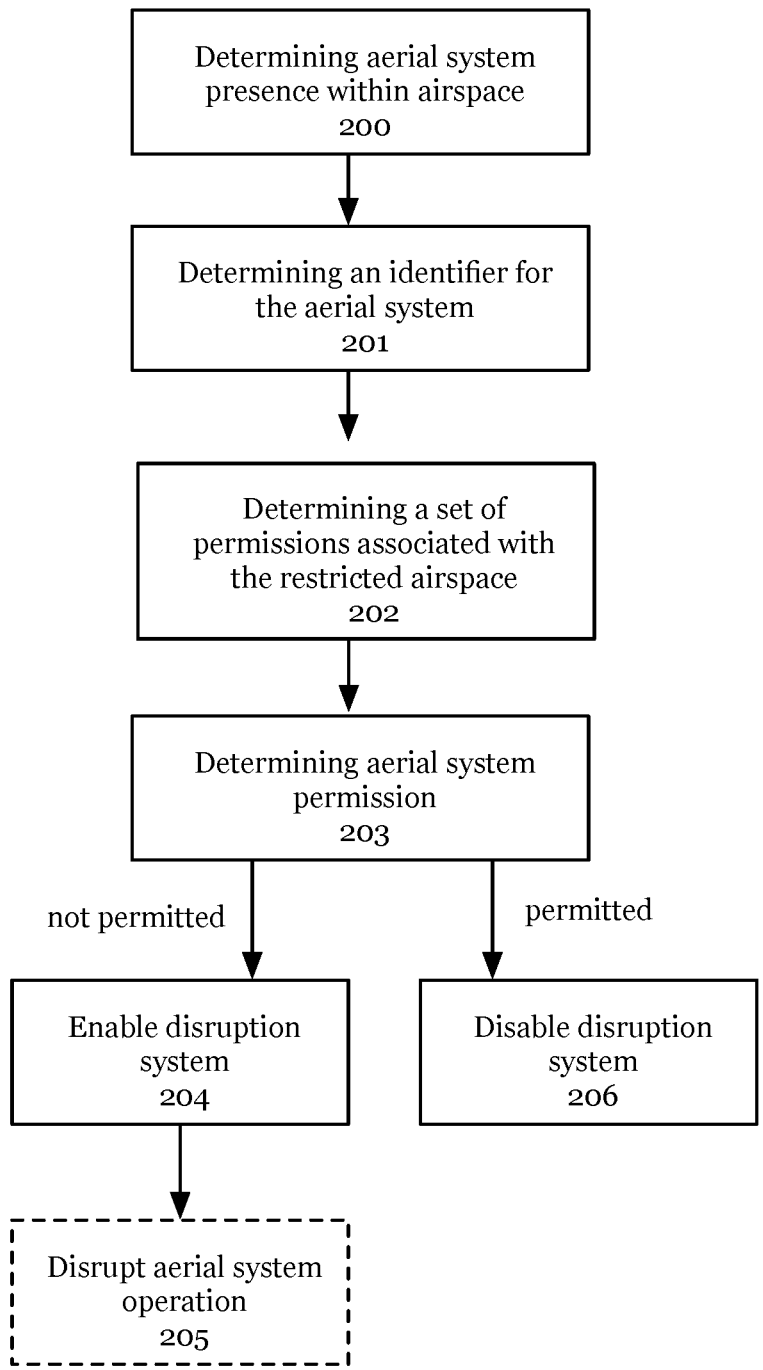
FIG. 2 is a flowchart representation of the method of aerial system discrimination.

As shown in FIG. 2, the method for aerial system discrimination and action includes: determining that an aerial system has entered restricted airspace 200, determining an aerial system identifier 300 for the aerial system 201, determining a set of permissions associated with the restricted airspace 202, and determining whether the aerial system parameters are permitted based on the set of permissions 203. Further, if the aerial system is not permitted, enabling a disruption system 204, and disrupting the operation of the aerial system 205. Alternatively, if the aerial system is permitted, disabling the disruption system 206. The method can be entirely or partially performed by: the permissions module 103, the identification receiver 102, the disruption system 105, or by any other suitable system. The method is preferably performed in response to the presence of an aerial system 100, but can alternatively be performed at any other suitable time.

4.1 Entering of Restricted Airspace

Determining that an aerial system 100 has entered restricted airspace 301ab functions to trigger permissions analysis. The restricted airspace can be: a geofenced volume (e.g., geofenced geographic area and altitude range), a predetermined radius from a reference point (e.g., the disruption system can be the reference point), or be defined in any other suitable manner.

In a first variation, an aerial system 100 is determined to have entered restricted airspace based on sensor measurements 306 recorded by sensors 609 associated with the airspace (e.g., sensors monitoring the airspace, mounted to buildings or other static mounting points). In a first specific example, an aerial system 100 is determined to have entered restricted airspace when microphones on the periphery of the airspace record acoustic frequencies within a predetermined range. In a second specific example, an aerial system 100 is determined to have entered restricted airspace when a light beam is intercepted.

In a second variation, an aerial system 100 is determined to have entered restricted airspace based on sensor measurements 306 received from the identification receiver 102. In a first specific example, an aerial system 100 is determined to have entered restricted airspace when microphones on the identification receiver 102 and/or disruption system 105 record acoustic frequencies within a predetermined range. In a second specific example, an aerial system 100 is determined to have entered restricted airspace when an aerial system 100 is recognized within an image recorded by the identification receiver 102 (e.g., wherein the camera focal length can bound the monitored airspace).

In a third variation, an aerial system 100 is determined to have entered restricted airspace based on sensor measurements 306 received from the disruption system 105, wherein airspace presence within the airspace is inferred from sensor measurements 306 indicative of user response to the aerial system 100. In a specific example, an aerial system 100 is determined to have entered restricted airspace when the on-board accelerometer indicates that the disruption system 105 has been picked up, or the on-board gyroscope indicates that the disruption system 105 is being aimed. However, aerial system 100 presence within the airspace can be otherwise determined or inferred.

4. Identifying an Aerial System

Determining an aerial system identifier 310 functions to identify the aerial system 100. The aerial system identifier 310 is preferably determined in response to determination that an aerial system 100 has entered the airspace, but can be determined at any other suitable time. The aerial system identifier 310 is preferably determined by the identification receiver 102, but can alternatively be determined by the permissions module 103, a remote computing system (e.g., a REST server), or by any other suitable system. The identifier for the intruding aerial system 100 can be determinable (e.g., result in a readable identifier) or indeterminable (e.g., be unreadable, not present, incompatible, etc.).

The former can be used to determine whether the corresponding aerial system 100 has permissions for the airspace, or be otherwise used. The latter can be automatically classified as unauthorized, or be otherwise treated.

In a first variation, the aerial system identifier 310 is read from an image of the aerial system 100. In a specific example, the identification transmission system 101 can be an optical image, wherein the aerial system identifier 310 is read from or retrieved based on the optical image recorded in an image of the aerial system 100.

In a second variation, the aerial system identifier 310 is received by the discrimination system 110, wherein the identification transmission system 101 broadcasts the aerial system identifier signal 300 at a predetermined frequency.

In a first embodiment of the second variation, the identification transmission system 101 broadcasts the same aerial system identifier signal 300 over time. In this embodiment, the aerial system identifier 310 can be determined based on a single transmission.

In a second embodiment of the second variation, the identification transmission system 101 broadcasts different aerial system identifier signals 300 for the aerial system 100 over time (e.g., every other broadcast identifier is different, etc.). In this embodiment, the aerial system identifier 310 can be determined based on: the transmission content and a timestamp that the transmission was received; a time-ordered series of transmission content, or any other suitable set of transmissions. In one example, a permanent aerial system identifier 310 can be calculated from one or more transient aerial system identifier signals based on an equation, wherein the permanent aerial system identifier 310 is used for permissions analysis. In this example, the transient aerial system identifiers can be automatically generated by the identification transmission system based 101 on the equation and the permanent aerial system identifier. The equation can change over time, wherein the changing equations used by the identification transmission system 110 and system determining the permanent aerial system identifier 310 are preferably synchronized, but can alternatively be unsynchronized, periodically retrieved by the aerial system 100 (e.g., downloaded from a server), or determined at any other suitable time. Alternatively or additionally, the calculation can be based on a timestamp (e.g., actual or anticipated transmission time, actual or anticipated receipt time, etc.). However, the calculation can be based on any other suitable parameter.

In a specific example, the aerial system identifier 310 is automatically generated based on the hidden, permanent aerial system identifier 310 and the Service Set Identifier (SSID) for the WIFI chipset of the identifier transmission system 101. The transmitted temporary aerial system identifier 310 is preferably refreshed (e.g., recalculated, regenerated, etc.) at a predetermined frequency (e.g., every 10 s). The identification receiver 102 can receive one or more temporary aerial system identifiers from the aerial system 100, determine the SSID of the identifier transmission system 101, can determine the permanent aerial system identifier 310 based on the SSID and/or based on the equation(s) used to generate the temporary identifiers, as determined from associated timestamps. However, the aerial system identifiers 310 can be otherwise determined.

In a third variation, determining the aerial system identifier 310 includes: requesting the aerial system identifier 310 from the aerial system 100 with the disruption system 105 (e.g., challenging the aerial system 100); and receiving the aerial system identifier signal 300 from the aerial system in response to aerial system receipt of the request (e.g., answering the disruption system 105). The returned aerial system identifier signal 300 can additionally or alternatively include a security key (e.g., private key, etc.) or include any other suitable verification information.

4.3 Authenticating an Aerial System

Determining an aerial system identifier 310 can optionally include verifying the authenticity of the aerial system identifier 310. This functions to identify aerial systems 100 with fake identifier transmission systems, wherein such systems can be treated as unauthorized or otherwise treated. In a first variation, authentication is accomplished by recording a series of broadcast aerial system identifier signals 300 and verifying the authenticity based on the identifier series. For example, the identifier series can be compared to an expected identifier series, wherein the aerial system 100 is deemed fake when the actual series differs from the expected series. In a second variation, authentication is accomplished by using a secondary identifier. For example, the authenticity of the identifier transmission system 101 can be verified when a first aerial system identifier signal 300 received from a WiFi transmitter (e.g., removably couplable to the aerial system) is associated with a second aerial system identifier 310 extracted from a pattern of pulsed light (e.g., wherein the light source is integrated into the aerial system 100). In a third variation, authentication is accomplished by using a communications network interface identifier (e.g., MAC address). However, the aerial system identifier 310 can be otherwise verified.

The method can optionally include determining instantaneous or anticipated aerial system function. The aerial system function is preferably determined in response to determination that an aerial system 100 has entered the airspace, and can additionally be determined before or after aerial system identifier 310 determination, or be determined at any other suitable time. The instantaneous or anticipated aerial system function can be determined by a function determination module on the permissions module 103, a remote computing system (e.g., a REST server), by the identification receiver 102, or by any other suitable system. The function determination module can be a machine learning module (e.g., be updated based on whether the anticipated function was actually performed), be a deterministic module, or be any other suitable module. The instantaneous or anticipated aerial system function can be determined based on information indicative of aerial system function. Examples of information indicative of aerial system function can include: one or more sensor measurements 306 from the identification reader 102 and/or disruption system 105, time-ordered sensor measurements 306 from the identification reader 102 and/or disruption system 105, or any other suitable set of information.

In a specific example, the information indicative of aerial system function can include a signal power measurement recorded by a radio of the disruption system 105, wherein the aerial system 100 is categorized as broadcasting media in response to the signal power measurement exceeding a first power threshold, and not broadcasting media in response to the signal power measurement falling below a second power threshold (different or the same as the first power threshold). The broadcasting type (e.g., streaming, sending intermittent packets, etc.) can be further determined based on the signal power pattern (e.g., based on pattern matching, categorization, etc.). In a second specific example, the information indicative of aerial system function can include an image frame, which can be processed (e.g., using image processing techniques, such as image segmentation, shape recognition, feature classification, etc.)

to determine whether the aerial system includes one of a set of restricted functional components (e.g., camera, payload, etc.). In a third specific example, the information indicative of aerial system function can include a series of video frames including the aerial system, which can be used to predict the aerial system flight path and/or target endpoint (e.g., determine the probability that the aerial system flight path will intercept an endpoint for each of a set of endpoints). However, the permissions module 103 can receive any other suitable information, which can be used in any other suitable manner.

4.4 Permissioning an Aerial System

Determining a set of permissions associated with the restricted airspace functions to identify metrics by which to determine whether the aerial system 100 is permitted within the airspace. Determining the set of permissions associated with the restricted airspace preferably includes determining an airspace identifier for the airspace and determining the permissions associated with the airspace identifier, but the set of permissions can be otherwise determined.

Determining an airspace identifier associated with the aerial system functions to determine the identifier for the airspace for which permissions need to be determined. The airspace can be the airspace that the aerial system 100 is instantaneously within, be airspace that the aerial system 100 was within (e.g., a predetermined time duration prior), or be airspace that the aerial system 100 will be in (e.g., within a predetermined time duration). In a first variation, the airspace identifier can be received from the identification receiver 102, along with the aerial system identifier 310. In this variation, the airspace identifier can be read off a beacon mounted proximal or within the physical volume or otherwise determined.

In a second variation, the airspace identifier can be automatically determined based on information indicative of aerial system location. Examples of information indicative of aerial system location can include: the disruption system identifier (e.g., wherein the airspace identifier is associated with one or more disruption system identifiers); the disruption system geographic location (e.g., wherein the airspace identifier is associated with the geographic location); sensor measurements 306 (e.g., acoustic, visual, or electromagnetic measurements) from a set of sensors with known locations, wherein the aerial system location can be triangulated from the sensor measurements 306 (e.g., wherein the airspace identifier identifies the triangulated region); disruption mechanism tilt and/or heading (e.g., orientation sensor measurements 306), wherein the airspace identifier identifies the airspace that the disruption mechanism is aimed at; whether distance-restricted communication systems are connected to the aerial system (e.g., WiFi, BLE, LTE, NFC, etc.), wherein the airspace identifier identifies a geographic region encompassing the connectivity radius from the communications system; or be determined based on any other suitable information. However, the airspace identifier can be otherwise determined.

Determining the permissions based on the airspace identifier functions to retrieve the permissions for the airspace. The permissions are preferably retrieved for the airspace identifier from the permissions module 103 (e.g., remote computing system, onboard permissions, etc.), but can alternatively be dynamically determined, be default permissions, or otherwise determined. The permissions are preferably determined based on the airspace identifier, but can alternatively be determined based on secondary information, such as weather information, calendar information, time information, social media, instantaneous location of an entity of interest (e.g., person of interest), predicted location of an entity of interest, or any other suitable secondary information. The secondary information can be used to filter, adjust or otherwise influence the determined airspace permissions.

In one example, dynamically determining the permissions can include: automatically determining a concurrent event occurring within or proximal the airspace and determining permissions based on the event features (e.g., event type, pre-set permissions, etc.). In a second example, dynamically determining the permissions can include: automatically determining the location of a person of interest, and automatically adjusting the permissions associated with airspace proximal the location. In a third example, dynamically determining the permissions can include: determining current and/or forecasted weather for the airspace and adjusting the permissions to accommodate for the weather (e.g., shifting the altitude range permitted to the aerial system from "permitted above 100 ft" to "permitted above 200 ft" in response to forecasted high winds). However, the permissions can be otherwise determined.

Determining whether the aerial system parameters are permitted based on the set of permissions functions to determine: whether the aerial system is permitted within the airspace, whether the instantaneous or anticipated aerial system functions are permitted within the airspace, whether the instantaneous or anticipated aerial system functions are permitted for the specific aerial system within the airspace; or determine any other suitable set of permissions. The aerial system parameters can be: permitted, prohibited, partially permitted (e.g., wherein the aerial system is permitted but the function is not), or have any other suitable outcome. The permission can be determined after aerial system identifier 310 determination, aerial system function determination, airspace permissions determination, or at any other suitable time. The permission can be determined by the permissions module 103, a remote computing system (e.g., a REST server), by the identification receiver 102, or by any other suitable system.

The aerial system parameter permission is preferably determined by comparing the aerial system parameters (e.g., identifier, function, etc.) with the permissions for the airspace, but can alternatively be otherwise determined. In one example, the aerial system is deemed not permitted when the aerial system lacks an identifier, the identifier is not on the list of permitted aerial system identifiers for the airspace, or the identifier is on a list of prohibited aerial system identifiers for the airspace. In a second example, the aerial system is deemed not permitted when the aerial system function (e.g., anticipated or instantaneous) is not on the list of permitted aerial system functions for the airspace. In a third example, the aerial system is deemed partially permitted when the aerial system identifier 310 is permitted for the airspace but the function is not permitted for the aerial system identifier 310 within the airspace. However, the aerial system permissions can be otherwise determined.

4.5 Disrupting an Aerial System

The method can optionally include controlling disruption system operation based on the aerial system permission determination, which functions to selectively enable or disable the disruption system. Alternatively or additionally, the method can include controlling one or more auxiliary systems (e.g., notifications, alarms, etc.) based on the aerial system permission determination. Controlling disruption system operation can include: selecting a disruption system operation mode based on the determined aerial system permission and controlling the disruption system operation to meet the selected mode. Selecting a disruption system operation mode based on the determined aerial system permission preferably includes: selecting an enabled operation mode in response to aerial system classification as not permitted (e.g., prohibited) and selecting a disabled operation mode in response to aerial system classification as permitted. Selecting the disabled operation mode can additionally include selecting different operation modes for different disruption system functions based on the aerial system permission.

For example, a jamming mechanism can be selectively enabled but an interdiction module selectively disabled in response to detection of unpermitted streaming for a permitted aerial system.

Figure 5:
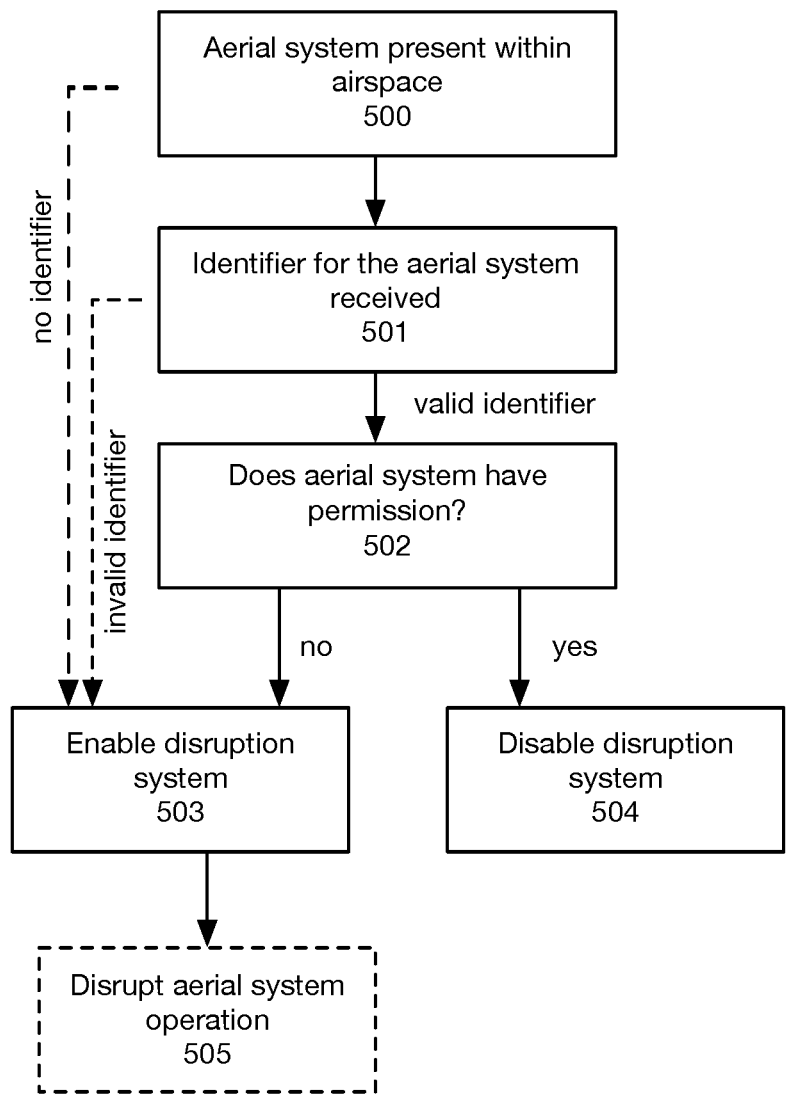
FIG. 5 is a flowchart representation of a variation of the method of aerial system discrimination.

In another example, certain scenarios may require the disruption system 105 to be ready to engage on short notice. As depicted in FIG. 5, the disruption system 105 may thus be preemptively enabled if certain conditions are met (e.g. aerial system detected w/o an identifier 500, identifier is received but is invalid 501, identifier is valid but is not permissioned 502, etc.). Such a configuration would minimize any delays associated with powering on the disruption system 105 and thus allow the system to respond to fast moving aerial systems 100. However, the disruption system operation mode can be otherwise selected.

Controlling the disruption system operation to meet the selected mode preferably includes: sending instructions indicative of the selected operation mode 305 to the control system 104, wherein the control system 104 is placed in the selected operation mode 305 or places the disruption system 105 in the selected operation mode 305.

However, disruption system operation can be otherwise controlled.

The method can optionally include contacting the aerial system pilot prior to disruption system activation. In one variation, this can include: determining a user identifier associated with the aerial system 100 based on the aerial system identifier 310; determining contact information for the user identifier (e.g., email, social networking system account, phone number, etc.), and contacting the user using the contact information. Contacting the user can include: presenting the user with a notification (e.g., sending, displaying, etc.), wherein the notification can notify the user that the aerial system is within restricted airspace, give the user a warning (e.g., a time limit to leave the restricted airspace), query whether the user is the pilot, or present any other suitable information to the user. However, the user can be otherwise contacted. The user information can be stored by the permissions system, retrieved, or otherwise obtained.

4.6 Identifier Reassignment

Figure 4:
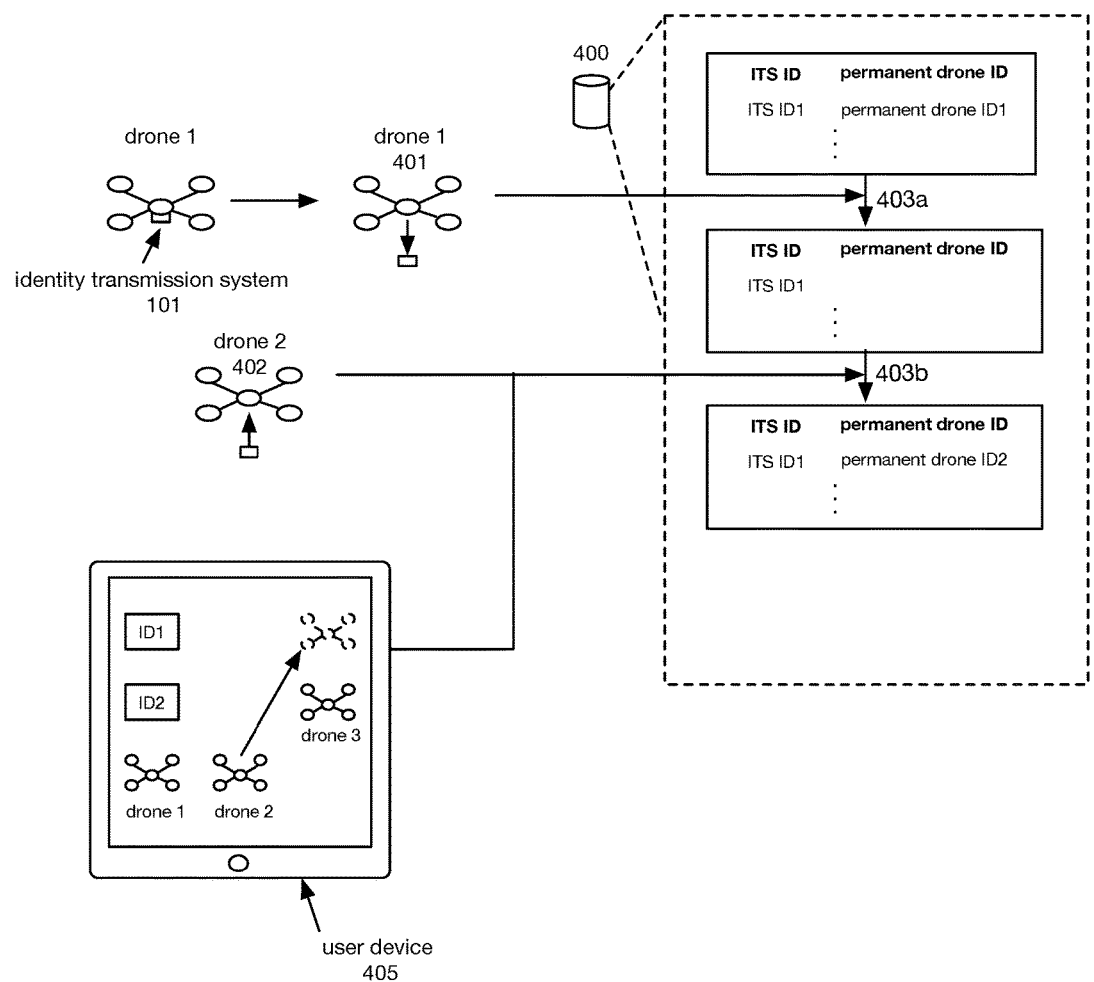
FIG. 4 is an example of identity transmission system reassignment.

As shown in FIG. 4 the method can optionally include reassigning identifier transmission systems 101 to different aerial systems, which functions to enable a user to use one identifier transmission system 101 for multiple aerial systems. Reassigning the identifier transmission system 101 can include: detecting a reassignment event 401, disassociating the identifier transmission system 101 from a first aerial system identifier 403*a*, detecting an assignment event for a second aerial system 402, and associating the identifier transmission system 101 with a second aerial system identifier representative of the second aerial system 403*b*.

The detected reassignment event can include: physical identifier transmission system 1041 removal from the first aerial system 401 (e.g., detected by the microswitch), receipt of a reassignment selection from a user device 405 (e.g., at a native application executed on the user device), or be any other suitable reassignment event.

Disassociating the identifier transmission system 101 from a first aerial system identifier can include: disassociating an identifier for the identifier transmission system from the permanent aerial system identifier (e.g., in a database) 403*a*, deactivating the identifier transmission system 101, disassociating the system from any aerial system 100 (e.g., wherein the transmitted aerial system identifier signal 300 does not represent any recognized aerial system 100), or otherwise disassociating the identifier transmission system 101 from the first aerial system 401.

The assignment event can be: physical identifier transmission system 101 coupling to a second aerial system 402, receipt of an assignment selection from a user device 405 (e.g., entry of the permanent identifier for the second aerial system 402 in association with the identifier for the identifier transmission system, selection of an "assignment" icon, receipt of a virtual association between the systems from the user, etc.), or be any other suitable assignment event.

Associating the second aerial system 402 identifier with the identifier transmission system 101 can include: assigning the permanent identifier for the second aerial system 402 to the identifier for the identifier transmission system 101 in the database 403*c*, reactivating the identifier transmission system, or otherwise associating the identifier transmission system 101 with the second aerial system 402. The permanent second aerial system identifier 310 can be received from the user, automatically read from the second aerial system 402, retrieved from a third party database (e.g., manufacturer database), or otherwise determined.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

I claim:

1. A discrimination system comprising:
    an identifier transmission system coupled to an aerial system, wherein the identifier transmission system is configured to broadcast an aerial system identifier signal unique to the aerial system;
    an identification receiver;
    a permission module, wherein the identification receiver is configured to receive the aerial system identifier signal and to provide the aerial system identifier signal to the permission module, wherein the permission module is configured to determine that the aerial system associated with the aerial system identifier signal is not permitted to be in an airspace; and
    a disruption system configured to disrupt an operation of the aerial system, wherein the disruption system is preemptively enabled based the received aerial system identifier signal.

2. The system of claim 1, wherein the identifier transmission system and the identification receiver communicate using a radio chipset that is compatible with a communication protocol selected from the following: WiFi, LTE, or Bluetooth.

3. The system of claim 1, wherein the identification receiver is a mobile device.

4. The system of claim 1, wherein the identifier transmission system is configured to be reassigned from a first aerial system to a second aerial system.

5. The system of claim 1, wherein when the disruption system is enabled the aerial system is caused to be removed from the airspace.

6. The system of claim 1, wherein the disruption system comprises of a projectile launcher and an interdiction module.

7. The system of claim 1, wherein the disruption system comprises of an interceptor drone coupled with an interdiction module.

8. The system of claim 1, further comprising a control system for controlling the disruption system.

9. The system of claim 8, further comprising a logging system that is configured to record activity of at least one of the identification receiver, the permission module, or the control system.

* * * * *